US007624296B2

(12) United States Patent
Peters

(10) Patent No.: US 7,624,296 B2
(45) Date of Patent: Nov. 24, 2009

(54) METHOD AND APPARATUS FOR SYNCHRONIZING MULTIPLE DIRECT DIGITAL SYNTHESIZERS (DDSS) ACROSS MULTIPLE PRINTED CIRCUIT ASSEMBLIES (PCAS)

(75) Inventor: Michael Karl Peters, Colorado Springs, CO (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 562 days.

(21) Appl. No.: 11/641,677

(22) Filed: Dec. 20, 2006

(65) Prior Publication Data

US 2008/0150591 A1     Jun. 26, 2008

(51) Int. Cl.
*G06F 1/00* (2006.01)
*H03B 21/00* (2006.01)

(52) U.S. Cl. .................. 713/500; 327/105; 327/107
(58) Field of Classification Search .................. 713/500
See application file for complete search history.

(56) References Cited

U.S. PATENT DOCUMENTS

| | | | | |
|---|---|---|---|---|
| 5,010,506 A | * | 4/1991 | Hrncirik | 708/276 |
| 5,521,533 A | * | 5/1996 | Swanke | 327/107 |
| 5,943,010 A | * | 8/1999 | Rudish et al. | 342/372 |
| 6,748,407 B1 | * | 6/2004 | Oga | 708/271 |
| 6,976,183 B2 | * | 12/2005 | Gage et al. | 713/500 |
| 7,026,846 B1 | * | 4/2006 | Huntley et al. | 327/105 |
| 7,336,748 B2 | * | 2/2008 | Messier | 375/354 |
| 7,345,629 B2 | * | 3/2008 | Dulmovits et al. | 342/372 |

OTHER PUBLICATIONS

Jouko Vankka, a Direct Digital Synthesizer with a Tunable Error Feedback Structure, Apr. 1997, IEEE, vol. 45, No. 4.*
Qualcomm, Synthesizer Products Data Book, Qualcomm, 80-24127-1 A, Aug. 1997.*
Analog Devices, Inc., "AD9959 4-Channel 500 MSPS DDS with 10-Bit DACs Data Sheet (Rev. 0)", Analog Devices, Inc., Norwood, MA, 2005, 40 pages.

* cited by examiner

*Primary Examiner*—Suresh K Suryawanshi
(74) *Attorney, Agent, or Firm*—Davidson Berquist Jackson & Gowdey LLP

(57) ABSTRACT

A radio frequency generating system comprises a synchronization board that receives an external clock signal from a clock source and generates multiple copies of the external clock signal. Each of a plurality of signal generation board receives a copy of the external clock signal from the synchronization board. Each signal generation board comprises a plurality of direct digital synthesizers that are synchronized using the external clock signal.

4 Claims, 9 Drawing Sheets

METHOD AND APPARATUS FOR SYNCHRONIZING MULTIPLE DIRECT DIGITAL SYNTHESIZERS (DDSS) ACROSS MULTIPLE PRINTED CIRCUIT ASSEMBLIES (PCAS)

GOVERNMENT LICENSE RIGHTS

This invention was made with United States Government support under contract number F19628-02-C-0010, awarded by The United States Air Force. The United States Government has certain rights in this invention.

FIELD OF THE INVENTION

This relates to synchronizing multiple direct digital synthesizers (DDSs).

BRIEF DESCRIPTION OF THE DRAWINGS

The following description, given with respect to the attached drawings, may be better understood with reference to the non-limiting examples set forth with the drawings which are as follows.

INTRODUCTION

Direct digital synthesis is an increasingly popular technique for the generation of radio frequency (RF) signals due to its high performance and low cost. However, in applications where a precise phase relationship between multiple RF channels must be maintained, like beam steering in phased array radars, the use of direct digital synthesis has proven challenging.

A DDS creates RF signals by using a reference clock (REF_CLK) supplied from an external source and data programmed into registers of the DDS. The DDS uses the REF_CLK to create an internal system clock (SYS_CLK). The SYS_CLK is a multiple of the reference clock. The DDS uses the SYS_CLK to read the data programmed into the registers to create an RF signal output. The DDS also generates a synchronization clock (SYNC_CLK) to be used by external hardware to synchronize external hardware with the internal SYS_CLK of the DDS.

The basic DDS core architecture consists of a phase accumulator, which uses the data programmed into registers to set the output frequency and phase offset, a phase to amplitude sine or cosine lookup table, and a high-speed, high-performance DAC to generate an RF signal. A low pass filter at the output eliminates high frequency sampling images and passes a pure sine wave RF signal.

Data programmed into the registers can be overwritten using an update (UPDATE) signal to transfer data from the I/O buffers of a DDS to the active registers in the DDS core. The UPDATE signal must meet the setup and hold time specification with respect to SYNC_CLK to guarantee deterministic timing of the data transfer. If the setup and hold time is violated, an uncertainty of plus or minus one SYNC_CLK cycle occurs in the output signal.

Figure 1:
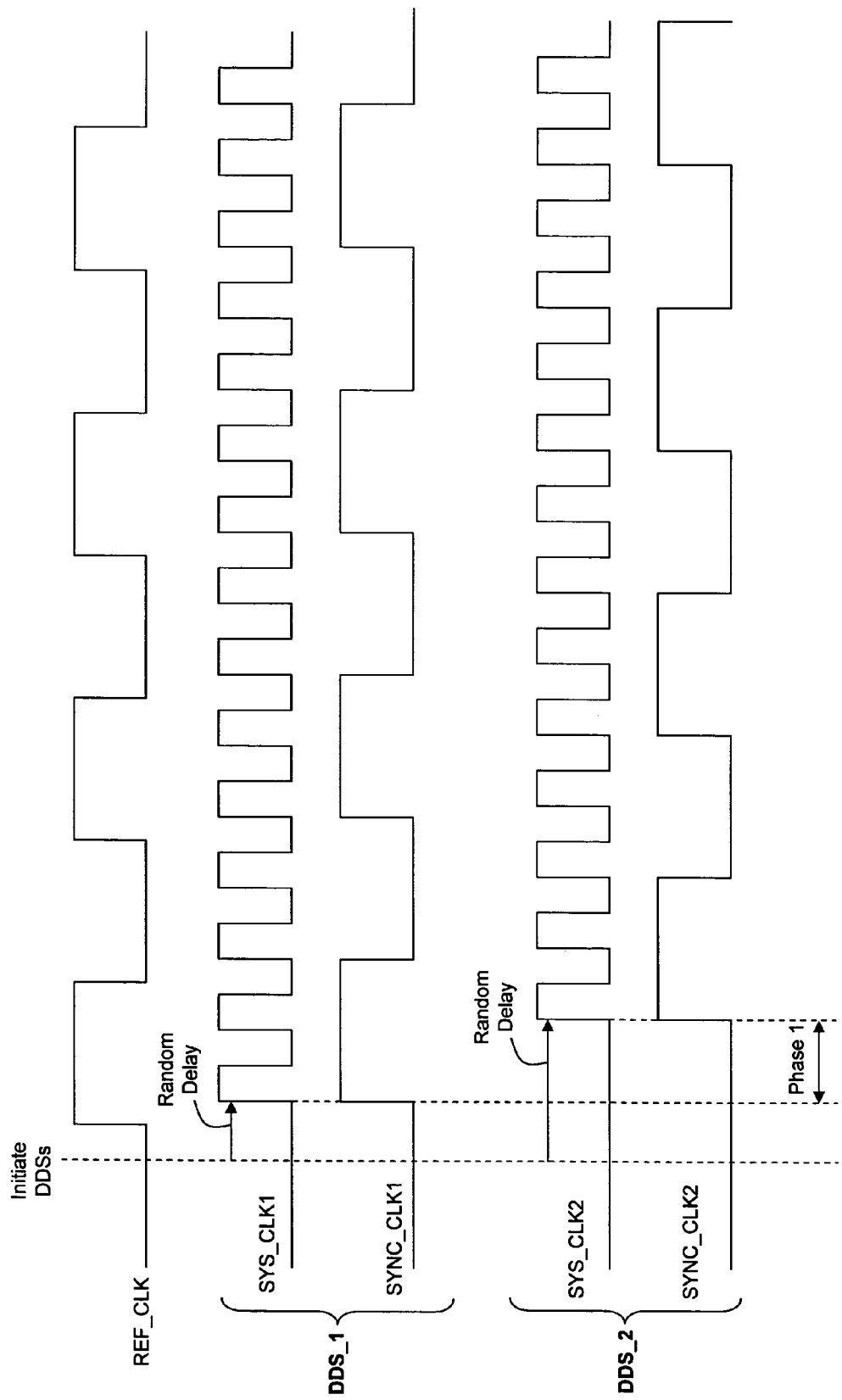
FIG. 1: An exemplary timing diagram illustrating the timing of DDSs.

FIG. 1 illustrates the various clocks for two DDSs. Here, DDS_1 and DDS_2 each receive a copy of REF_CLK and generate respective SYS_CLK signals that have frequencies that are a multiple of the REF_CLK. In this example, the DDSs are initiated at the same time, but SYS_CLKs are generated randomly with respect to the time at which the DDSs are initiated. The DDSs also generate respective SYNC_CLKs (SYNC_CLK1 and SYNC_CLK2) that are in phase with their respective SYS_CLKs. As shown in FIG. 1, the randomness at which the SYNC clocks are generated causes a phase difference (Phase 1) to be created between respective SYNC_CLKs, which results in a phase difference between respective SYS_CLKs. Such a phase difference is not necessarily problematic so long as it remains consistent. That is, the DDSs are said to be synchronized as long as the phase between the DDSs remains consistent.

Synchronization does not mean that the output signals are perfectly aligned at zero degree phase shift when a zero degree phase offset is programmed into each channel of the DDS. There could be phase shift in the output channel due to such circuit parameters as varying trace lengths and differences in components. However, synchronization does mean that the phase shift will be consistent after cycling power or when the DDS is updated. Phase shift compensation can be accomplished by either board or system phase calibration.

Lack of synchronization between devices can occur in two ways: the SYNC_CLK timing with respect to SYS_CLK will occur randomly when cycling power, or the UPDATE signal violates the setup/hold time with respect to the SYNC_CLK signal.

Synchronization between devices occurs when the following two factors have been achieved. First, the rising edge of each device's SYNC_CLK signal occurs on the same internal SYS_CLK edge when the power is cycled to the component. Second, the data transfer from the I/O buffers to the core registers occurs on the same SYNC_CLK cycle.

Figure 2:
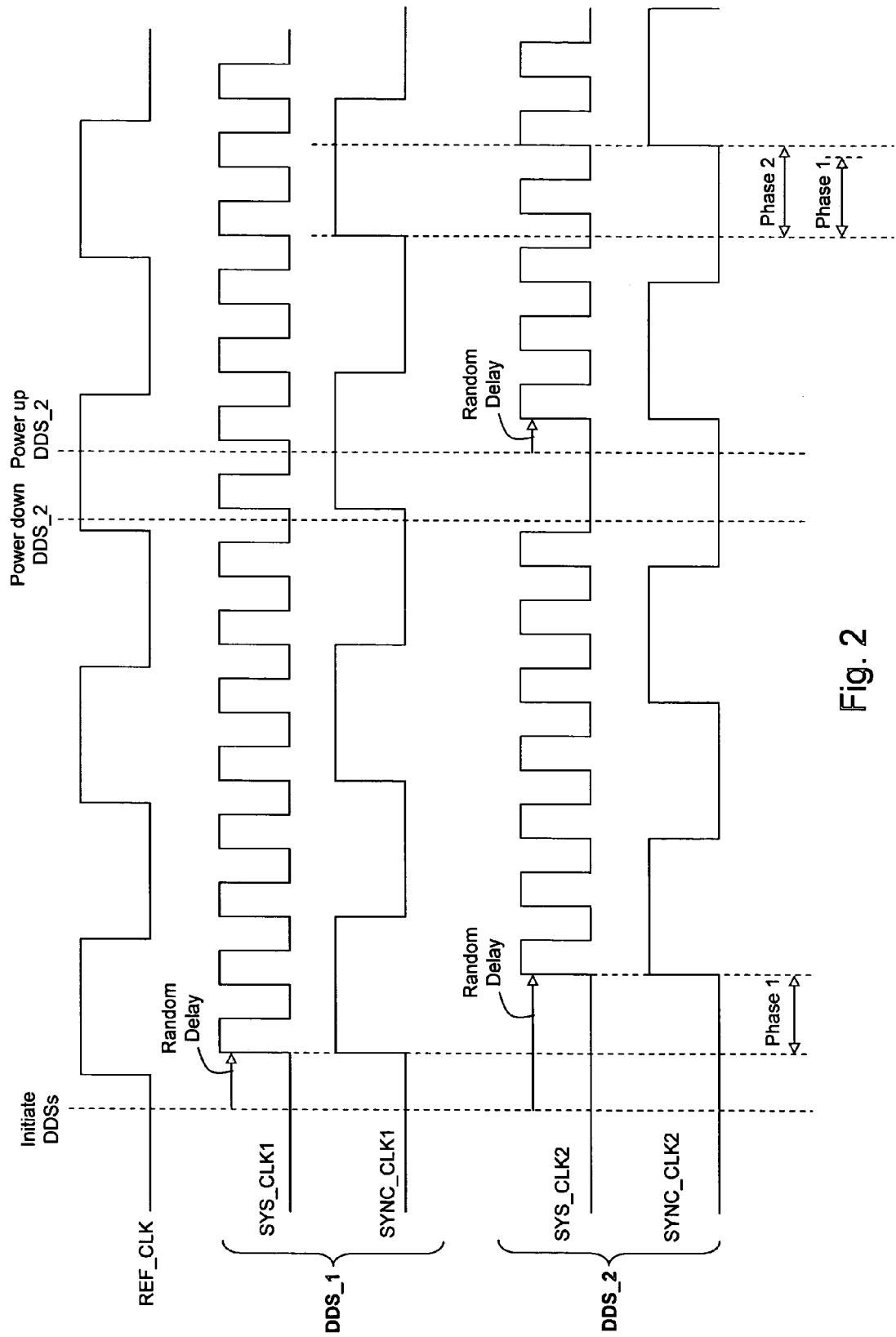
FIG. 2: An exemplary timing diagram illustrating unsynchronized DDSs.

FIG. 2 illustrates DDSs that are not synchronized either initially or after a DDS_2 power cycle. At initialization, DDS_1 and DDS_2 have different random delay times, causing the Phase 1 mis-synchronization (described with respect to FIG. 1). Also, DDS_2 is power cycled after the DDSs are initiated. Due to the randomness at which DDS_2 generates its SYNC_CLK after being powered on, a phase (Phase 2) is created between the SYNC_CLKs of DDS_1 and DDS_2 that is different from Phase 1. Since the phase relationship between the DDSs is not consistent after DDS_2 is power cycled, the DDSs are not synchronized.

A prior art solution to synchronize multiple DDSs is to use DDSs capable of receiving an external synchronization signal and to designate one DDS as a master and all of the other DDSs as slaves. The slave DDSs receive an external synchronization signal (SYNC_IN) from the master and use this signal to maintain synchronization with the master. Since all the DDSs are synchronized with the master, synchronization is maintained across all of the DDSs. The SYNC_IN signal is typically used by slave devices to synchronize the rising edge of SYNC_CLK to the master signal.

This implementation was developed for when all of the DDSs are installed on a single PCA. However, if the number of signals that need to be generated is great enough that multiple PCAs are required, the synchronization signal from the master DDS must be distributed to all of the PCAs.

Some commercial DDS application specific integrated circuits (ASICs) have the capability to synchronize multiple devices installed on the same PCA using a master-slave configuration recommended by the ASIC vendor. In this configuration, one DDS is programmed as a master, while the other DDSs are programmed as slaves. The master DDS generates a synchronization signal to which the slave DDSs synchronize their signal generation circuitry.

An example of a DDS that supports synchronization is the AD9959 made by Analog Devices, Inc. Reference is made to the disclosed document describing the AD9959, which is incorporated by reference in its entirety. The AD9959 supports multiple reference clock configurations to generate the internal SYS_CLK signal. A PLL allows multiplication of the REF_CLK frequency from 4× to 20× in integer steps. For example, multiplying a REF_CLK of 100 MHz by four will generate a SYS_CLK with a frequency that is 400 MHz. Since two samples per cycle are required to generate a sine wave with a DDS, the maximum output frequency will be 200 MHz. The AD9959 derives the SYNC_CLK by dividing the SYS_CLK by four. The AD9959 accepts a REF_CLK signal that has LVPECL signal levels and a SYNC_IN signal that has LVTTL signal levels.

To correlate the alignment of the SYNC_CLK edges, the AD9959 can be configured in an automatic mode that uses the SYNC_IN input signal to force the internal state machines controlling the timing for the rising edge of SYNC_CLK to a known state.

In automatic synchronizing mode, the slave device samples the SYNC_IN signal and a comparison of all state machines is made by the auto synchronization circuitry. If the device's state machines are not aligned properly to the SYNC_IN signal, the state machines are stalled for one SYS_CLK cycle. This auto-sample/compare/act procedure will produce a synchronized slave device within three SYNC_CLK periods.

The SYNC_IN signal synchronizes the SYNC_CLK signal in the devices so that the timing of SYNC_CLK to SYS_CLK is always the same after power has been cycled to the device. If synchronization does not occur, then the phase of the DDS's output will change each time the power is cycled to the DDS.

Should the UPDATE signal violate the setup and hold times with respect to SYNC_CLK, then the core registers of the DDS will update one SYNC_CLK cycle after the other devices. This could cause a random phase shift in the DDS's output signal of 10.0 ns with respect to another DDS's output.

Figure 3:
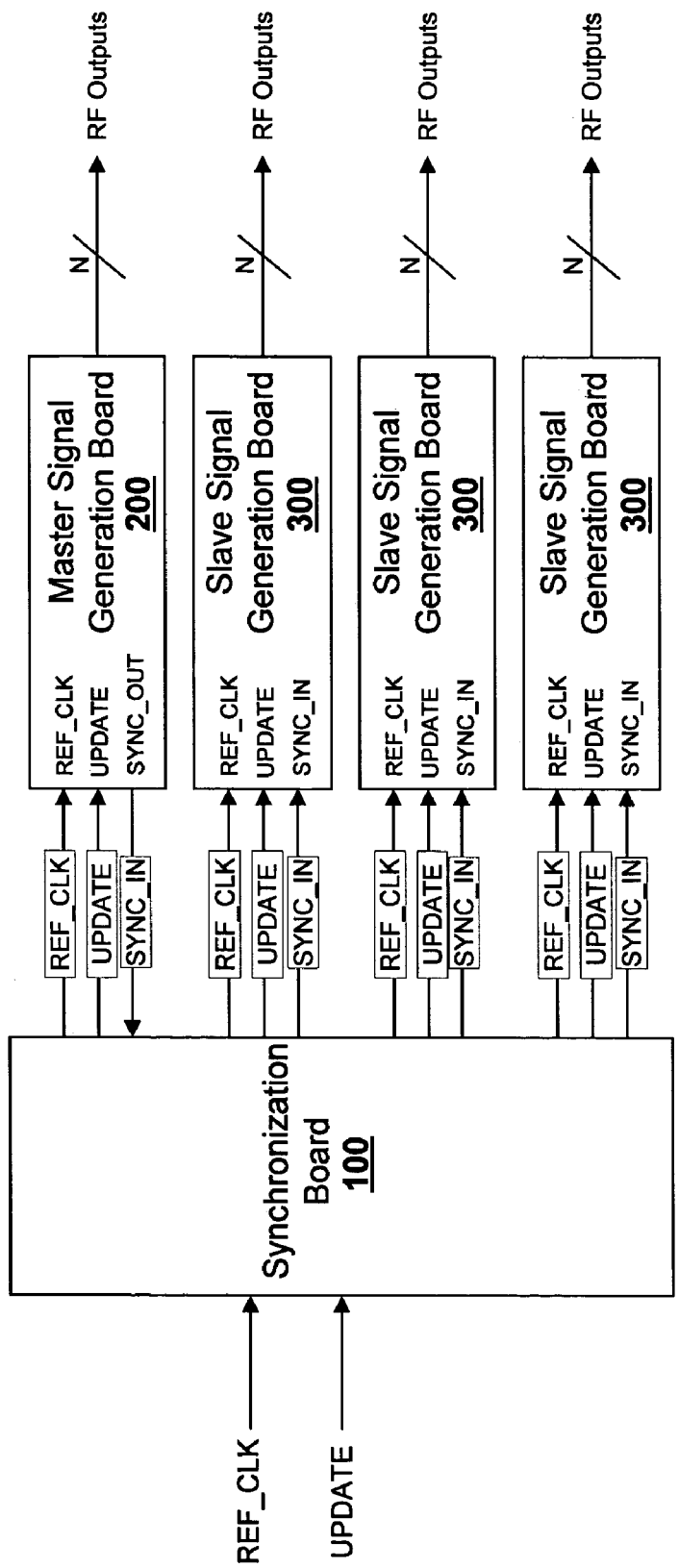
FIG. 3: A prior art DDS system incorporating a Master/Slave configuration.

FIG. 3 shows an example of a prior art architecture for synchronizing multiple DDSs across multiple PCAs. It is worth noting that when the master-slave synchronization scheme is employed across multiple PCAs, the master DDS may be separated from some of the slave DDSs by a number of meters.

In this configuration, the synchronization signal (SYNC_IN) is routed from the PCA containing the master DDS, master signal generation board 200, to a second PCA, synchronization board 100. The function of synchronization board 100 is to distribute the synchronization signal to those PCAs containing the slave DDSs, slave signal generation boards 300. The synchronization signal path necessarily includes a number of buffer/driver components not normally encountered in a single PCA implementation. The part-to-part output skew of each of these components adds uncertainty to the timing of the synchronization signal at the input (SYNC_IN) to each of the slave signal generation boards 300.

Figure 4:
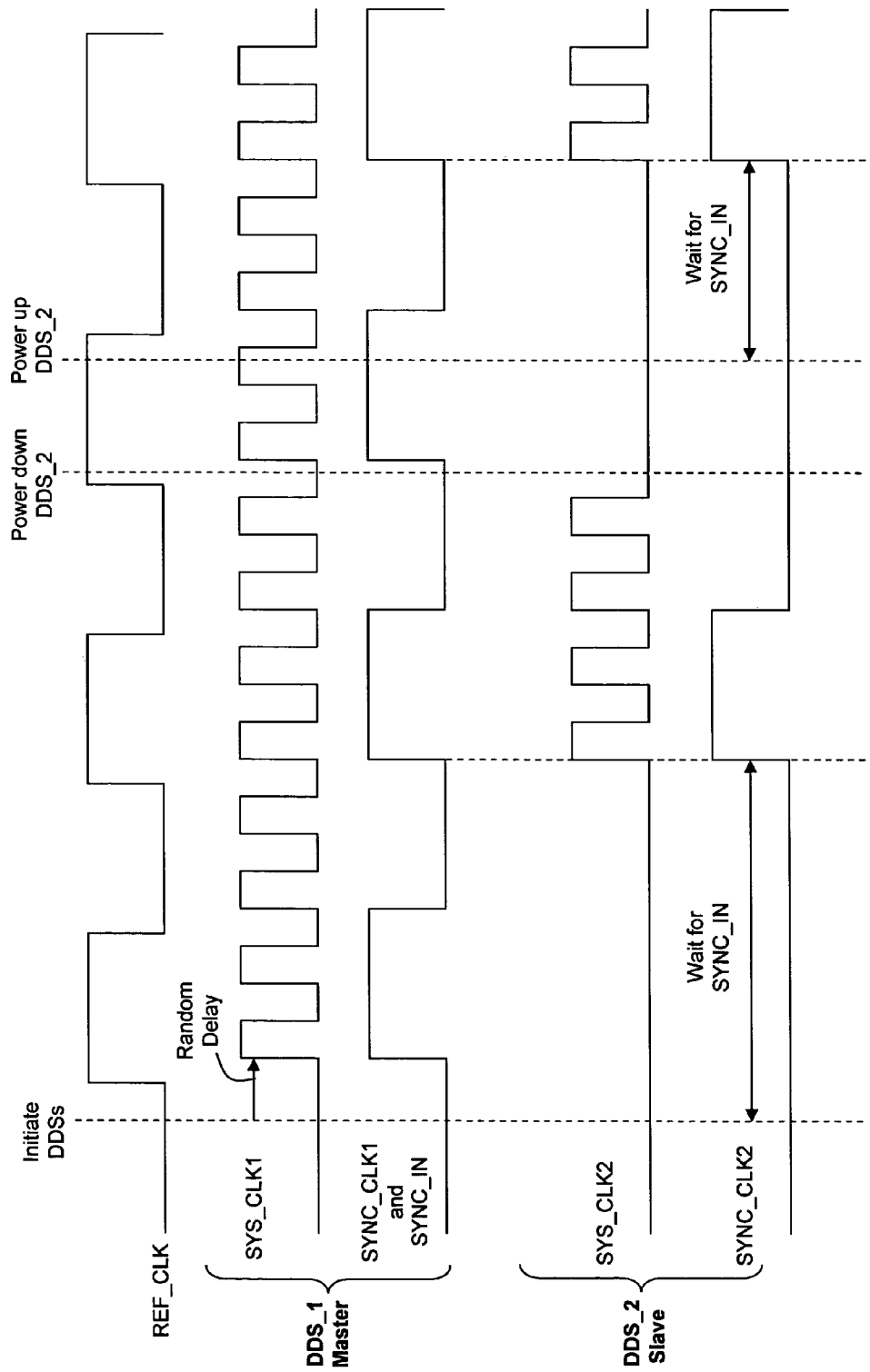
FIG. 4: An exemplary timing diagram illustrating how prior art Master/Slave DDS configurations synchronize DDSs.

FIG. 4 is a simplified example prior art timing diagram illustrating how a slave DDS is synchronized with a master DDS. In FIG. 4, DDS_2, the slave DDS, is programmed to synchronize SYNC_CLK2 with the rising edge of the SYNC_IN signal. Thus, even when DDS_2 is restarted with respect to DDS_1, the DDSs remain synchronized.

The timing of the synchronization signal (SYNC_IN) affects an internal DDS clock signal (SYNC_CLK). This clock signal (SYNC_CLK), in combination with an update signal (UPDATE), determines when buffered Input/Output (I/O) data is transferred to the DDS active core registers. If the update signal violates the setup/hold time with respect to the clock signal (SYNC_CLK), the timing of the data transfer cannot be guaranteed, so the DDSs will not be synchronized. Therefore, to guarantee DDS synchronization across multiple PCAs when there are multiple synchronization paths, all of the components in the paths need to go through the costly process of selecting each component by matching its part-to-part output skew to assure the SYNC_IN is the same for each DDS. Thus, a master/slave implementation becomes costly to implement where there are many PCA boards spanned across a large distance.

Further, this implementation has a number of additional drawbacks. It requires the design and construction of two unique types of signal generator boards, one to support a master DDS, and another to support the slave DDSs. Extra components and extra signal routing are also required on the synchronization board to support repeating of the synchronization signal. Also, the cables supplying the timing signals need to support three signals to each signal generator board.

The present system makes it possible to synchronize a large number of DDSs across multiple PCAs while reducing complexity and cost over the conventional synchronization scheme. Additional benefits of the present system include: reduced cost and complexity of manufacturing due to a reduction in the number of unique PCA designs and simplified signal distribution. The present system also removes the costs associated with matching the part-to-part skew within components required to guarantee the system's timing.

The present system produces an implementation that eliminates the need for an independent synchronization signal. Multiple DDS synchronization is accomplished by using a copy of the reference clock signal, instead of a separate synchronization signal. Since the reference clock signal is used for the clock signal and the synchronization signal, the amount of synchronization signals that need to be distributed across multiple PCAs in the system implementation is reduced by one. This reduces the complexity in both PCA design and signal distribution design.

The costs associated with the system implementation are reduced because there will be one less PCA design to complete. This implementation of synchronizing multiple DDSs across multiple PCAs requires only one PCA design that generates RF signals.

DETAILED DESCRIPTION OF THE PRESENTLY PREFERRED EXEMPLARY EMBODIMENTS

Figure 5:
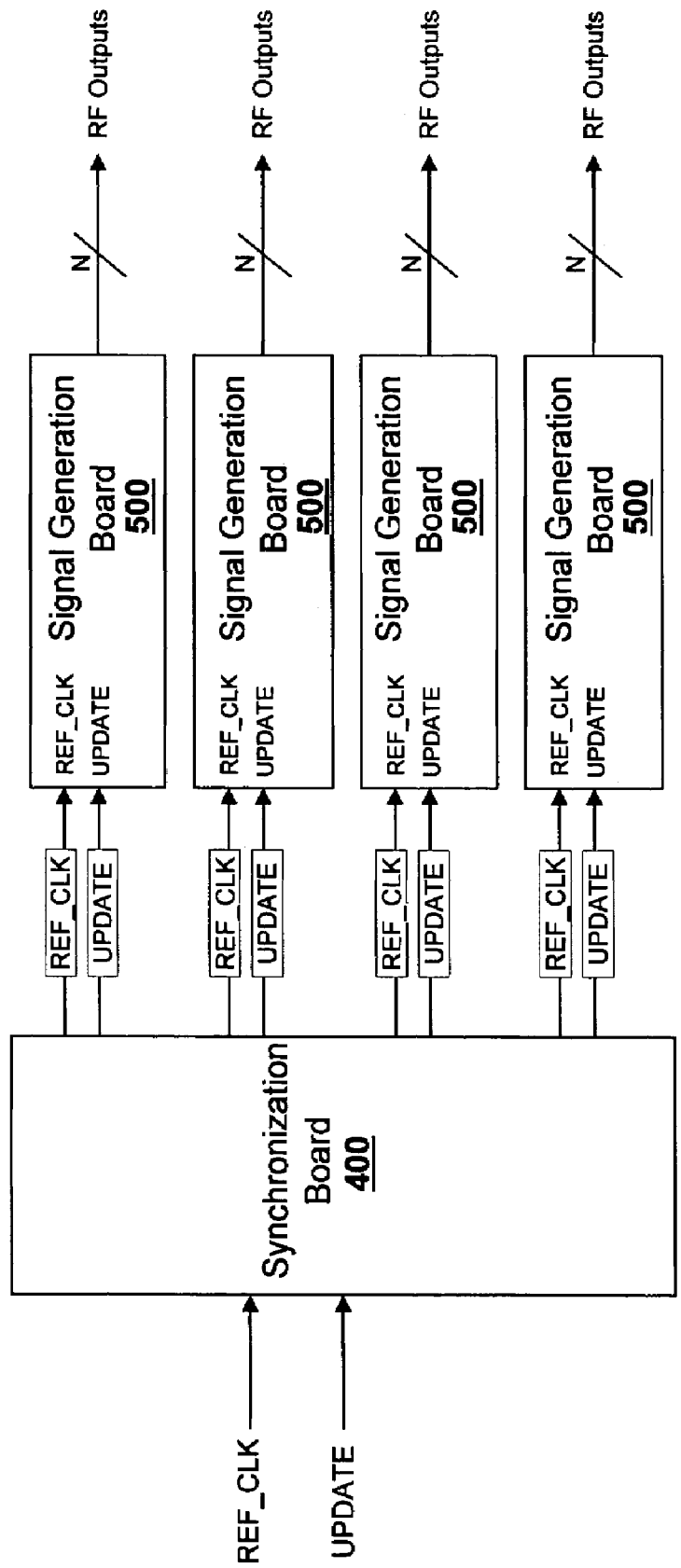
FIG. 5: An exemplary DDS system.

FIG. 5 shows a possible system implementation of the present method of synchronizing multiple DDSs across multiple PCAs. A copy of the reference clock signal (REF_CLK) is used as the synchronization signal, eliminating the need for an independent synchronization signal. To use a copy of the REF_CLK as a synchronization signal, the frequency of the REF_CLK, SYNC_CLK, and SYNC_IN signals must match.

The update signal (UPDATE) is used to transfer the data from the I/O Buffers into the DDS active core registers. Since there is no independent synchronization signal from a master DDS, only two signals need to be delivered to any individual DDS board. In this exemplary implementation, there are two AD9959 DDSs (for example) on each signal generation board 500.

In this arrangement, the components in the timing signal paths are much fewer in number than in the conventional arrangement. As a result, channel-to-channel circuit timing uncertainties, typically caused by part-to-part skew in buffer/driver components, are small enough that the synchronization timing can be guaranteed without custom matching of components.

In addition, compared to the conventional architecture, this method requires one design for the signal generator board 500. Also, the timing signal cabling only needs to support two signals instead of the three signals described with respect to the prior art. The cabling for the REF_CLK and UPDATE can use standard Category 6 P345 Patch Cables containing four twisted pairs. The other two pairs can be used for other signals that need to be distributed to all of the PCAs. Further, synchronization board 400 does not need to include components that establish a synchronization path.

Figure 6:
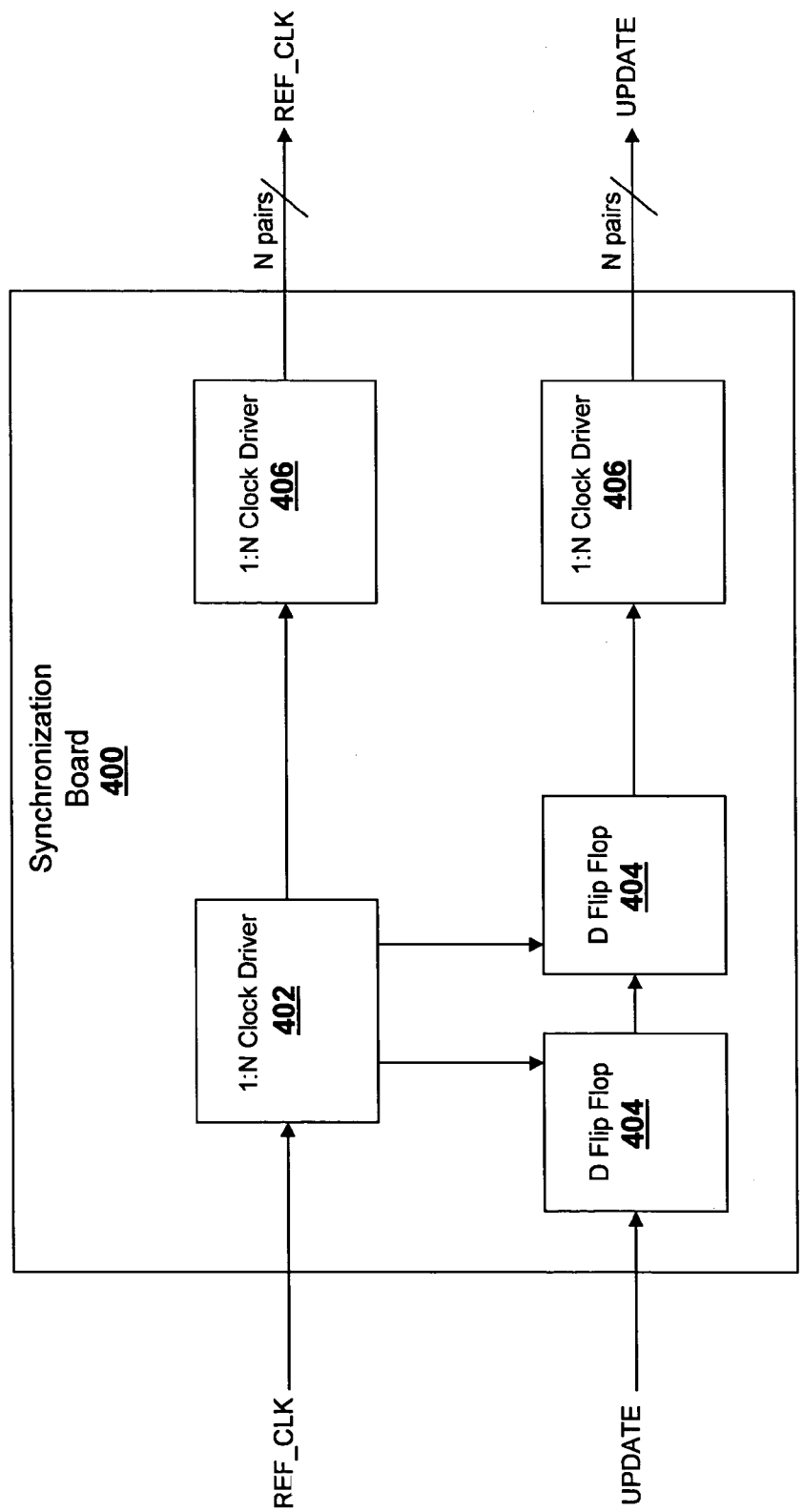
FIG. 6: An exemplary synchronization board.

FIG. 6 is detailed view of exemplary synchronization board 400. Synchronization board 400 performs two functions: it synchronizes the asynchronous UPDATE signal into the REF_CLK time domain and distributes N versions of the REF_CLK and the synchronized UPDATE signals to as many as N signal generation boards 500.

The REF_CLK signal is replicated by a 1:N clock driver IC 402 which in the exemplary embodiment replicates three signals. An example of a 1:N clock driver IC 402 that can be used is a 1:5 clock driver IC MC100EP14 manufacturer by ON Semiconductor. One of the replicated signals drives the 1:N clock driver IC 406 and the other two replicated signals clock the D flip flops 404 that are used to synchronize the UPDATE signals into the REF_CLK time domain. An example of D flip flops that can be used are MC100EP52 manufactured by ON Semiconductor. The output of one of a 1:N clock driver 406 becomes the REF_CLK input to each of the signal generation boards 500. An example of a 1:N clock driver IC 406 that can be used is a 1:10 clock driver MC100LVEP111 manufactured by ON Semiconductor.

The UPDATE signal is synchronized into the REF_CLK time domain by a multi-stage shift register consisting of two D Flip Flops 404. The synchronization of this the UPDATE signal guarantees that a deterministic timing relationship exists between the rising edge of the UPDATE signal and the rising edge of the REF_CLK signal. Once the UPDATE signal is synchronized, one of the outputs of a 1:N Clock Driver 406 becomes the UPDATE input to each of the signal generation boards 500.

Figure 7:
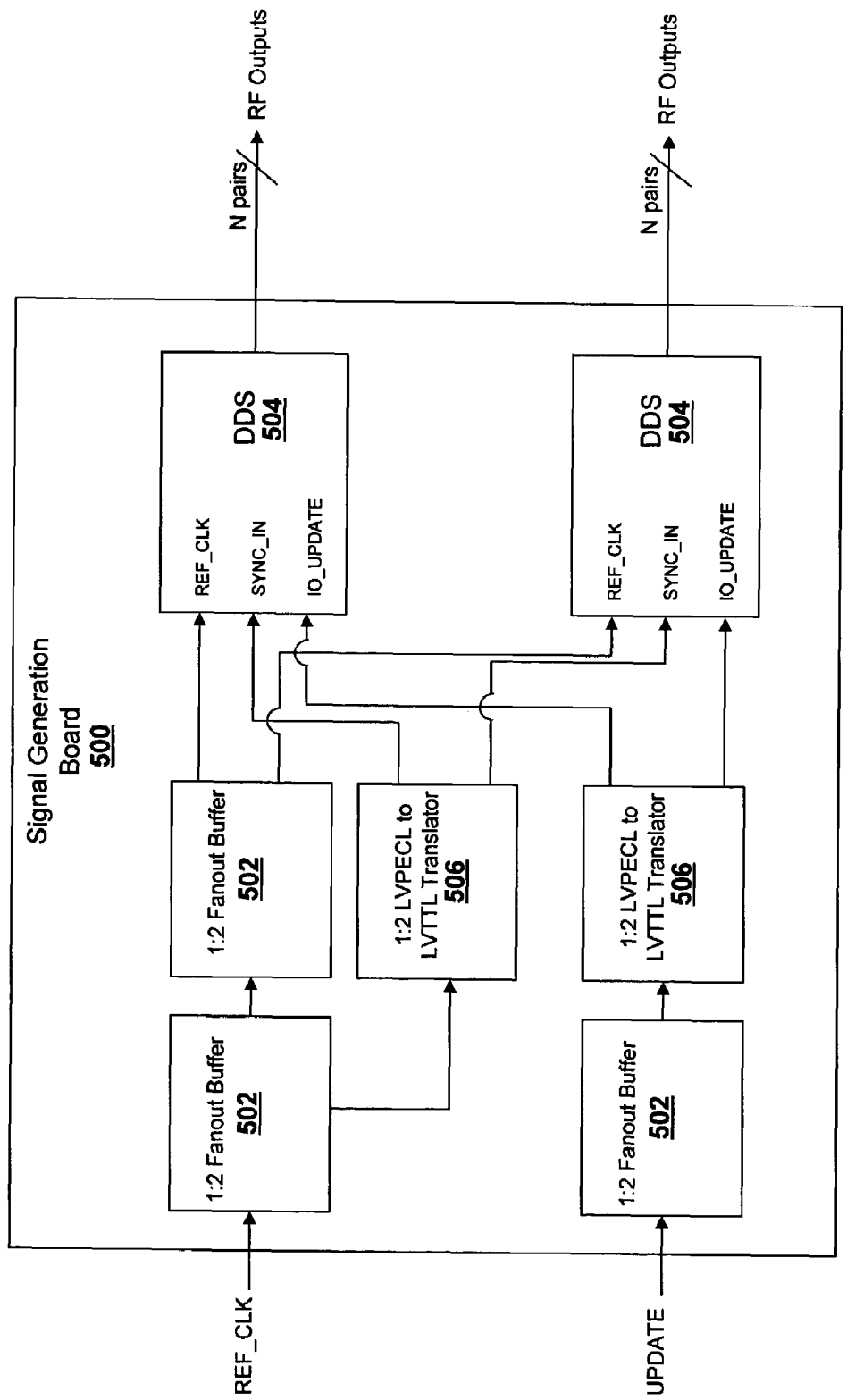
FIG. 7: An exemplary signal generation board.

FIG. 7 is a detailed view of exemplary signal generation board 500. On the signal generation board 500, the REF_CLK signal is replicated twice with a 1:2 fanout buffer 502. An example of a 1:2 fanout buffer that can be used is the MC100LVEP111 described above. One buffer output goes to another 1:2 fanout buffer 502 used to drive the REF_CLK input to two DDSs 504. The other output of the top level buffer is translated to LVTTL and replicated using a 1:2 LVPECL to LVTTL Translator 506. An example of a translator that can be used is the MC100EPT26 manufactured by ON Semiconductor. The outputs of the translator 506 become the SYNC_IN input to the two DDSs 504.

The UPDATE signal is replicated twice by a 1:2 fanout buffer 502. One of the outputs is translated to LVTTL and replicated using a 1:2 LVPECL to LVTTL translator 506. The outputs from the translator become the IO_UPDATE input to the two DDSs 504. The other output of the buffer can be used as the UPDATE signal for other circuits on the signal generator board 500. The UPDATE signal coupled with the SYN_CLK is used to transfer internal buffer contents into the core registers of the DDS 504. The combination of the SYNC_CLK and UPDATE provide the user with constant latency relative to SYS_CLK. This combination also ensures phase continuity of the analog output signal when a new tuning word or phase offset value is asserted.

The LVPECL I/O signal standard was selected due to an availability of components with small part-to-part skew. The part-to-part skew parameter is critical for components on the signal generator board 500 because the timing of the synchronization signals, REF_CLK, SYNC_IN, and UPDATE, must be as close to identical as possible to guarantee that the output signals are synchronized across all of the PCAs. Since LVPECL is a differential signal standard, there is increased noise immunity over single-ended signal standards. The disadvantage of LVPECL is that each signal requires a termination network at the input of the next component and there are twice as many signals to be routed.

For an implementation using the AD9959 DDS, the REF_CLK signal can be connected to the reference clock inputs at LVPECL signal levels through decoupling capacitors. The signals for the AD9959's IO_UPDATE and SYNC_IN inputs need to be converted from LVPECL to LVTTL.

In the case of the AD9959, the REF_CLK is programmed to be multiplied by four to generate SYS_CLK, and the SYS_CLK is internally divided by four to generate SYNC_CLK. The SYNC_IN signal frequency must match the SYNC_CLK. The SYNC_IN input signal is used to align the rising edge of SYNC_CLK. Instead of having to route a synchronization signal from a master DDS across many PCAs, another version of the REF_CLK signal is used for the SYNC_IN signal. This reduces the timing uncertainties to only the components and routing used to create an extra copy of REF_CLK and converts this signal from LVPECL signal levels to LVTTL signal levels.

Figure 8:
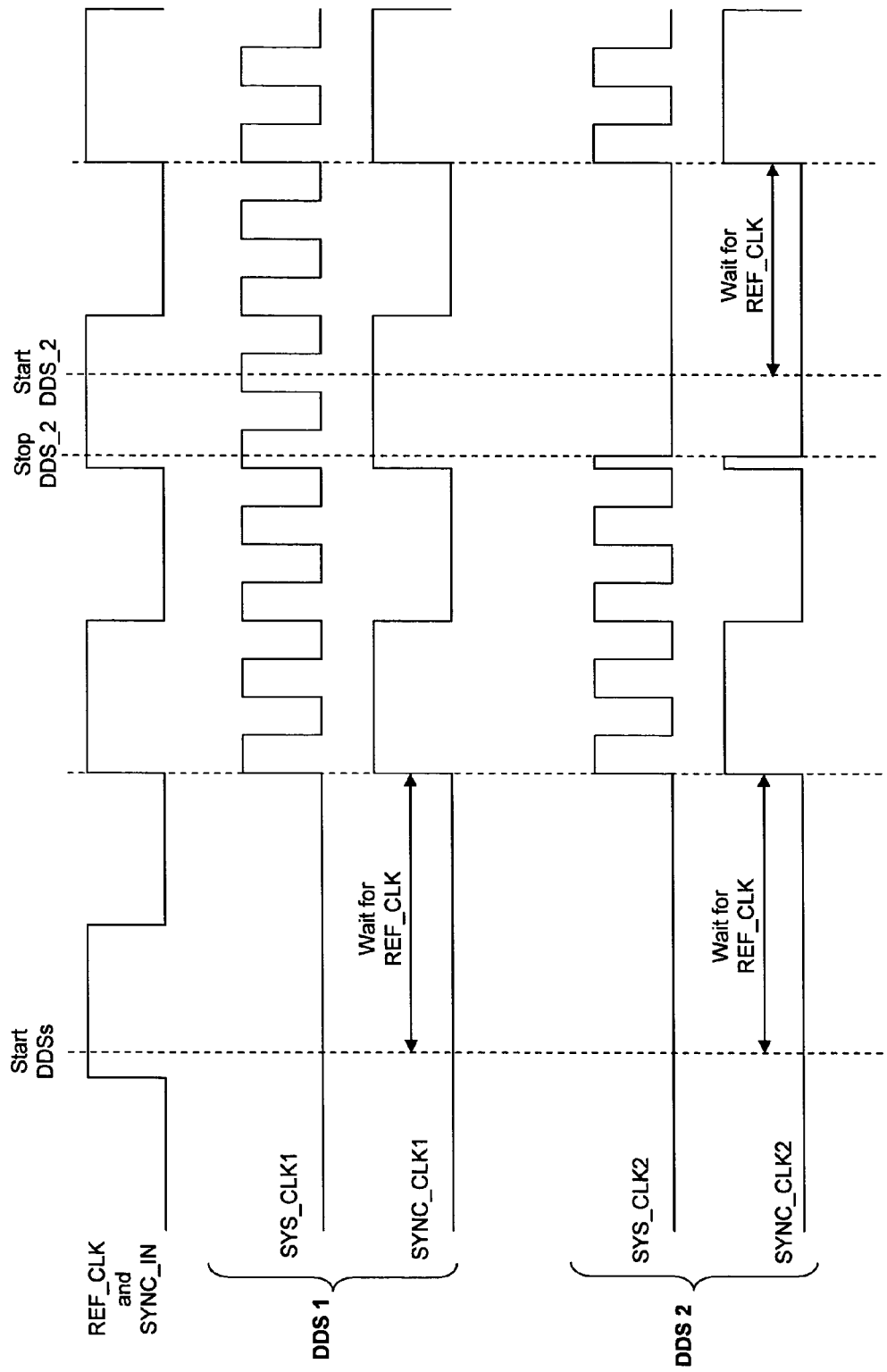
FIG. 8: An exemplary timing diagram illustrating how exemplary DDS system synchronizes DDSs.

FIG. 8 is a simplified example illustrating how DDSs are synchronized using a copy of REF_CLK. In FIG. 8, both DDSs, are programmed to synchronize SYNC_CLKs with the rising edge of the SYNC_IN signal, which in this case is the same as REF_CLK. Thus, even when DDS_2 is restarted with respect to DDS_1, the DDSs remain synchronized.

Figure 9:
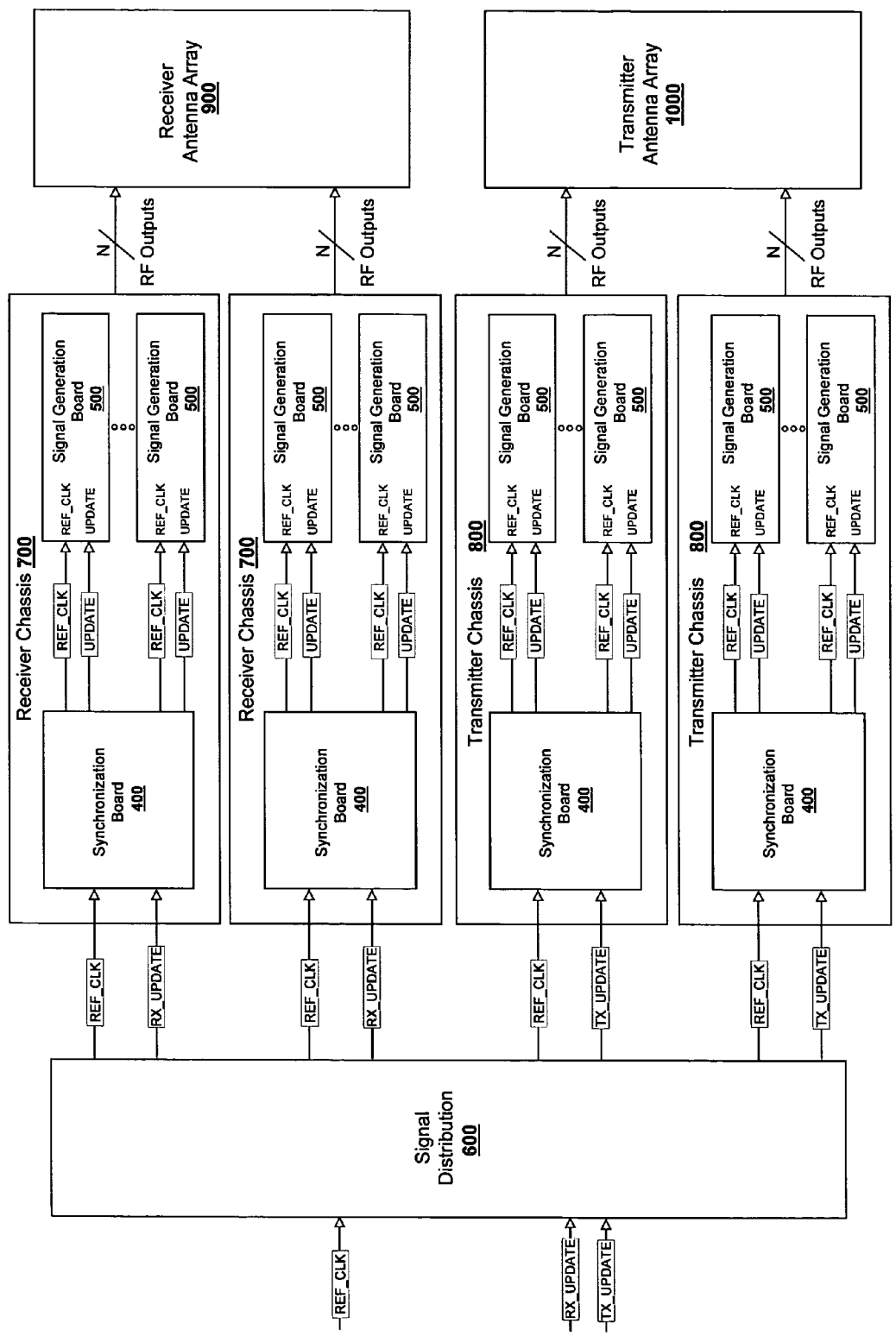
FIG. 9: An exemplary phased array radar system incorporating the exemplary DDS system shown in FIG. 5.

FIG. 9 shows an exemplary phased array radar system incorporating exemplary DDS systems described in accordance with FIG. 5. As shown in FIG. 9, the phased array radar system includes a plurality of DDSs systems. Each DDS system is enclosed within one of two types of chassis, a receiver chassis 700 or a transmitter chassis 800. The chassis are distinguished by the type of update signal each receives from signal distribution board 600. Signal distribution board 600 replicates signals in a manner similar to the way synchronization board 400 replicates signals and for the sake of brevity will not be described herein. Reference is made to FIG. 6 and description of synchronization board 400. RF signals generated from receiver chassis 700 are output to receiver antenna array 900. Likewise, RF signals generated from transmitter chassis 800 are output to transmitter antenna array 1000. The RF outputs provide beam steering for respective antenna arrays.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A radio frequency generation system comprising:
   a synchronization board that receives an external clock signal from a clock source and generates multiple copies of the external clock signal;
   a plurality of RF signal generation boards each of which receives a copy of the external clock signal from the synchronization board, wherein each signal generation board comprises:
      a plurality of direct digital synthesizers each having a reference clock input and a synchronization input;
      replicator circuitry that distributes substantially identical copies of the external clock signal to the reference clock inputs of each of said plurality of direct digital synthesizers; and
      translator circuitry that generates a translated version of the external clock signal and distributes the translated version of the external clock signal to the synchronization inputs of each of said plurality of direct digital synthesizers.

2. The radio frequency generation system of claim 1, wherein the synchronization board receives an update signal and synchronizes the update signal with the external clock signal.

3. The radio frequency generation system of claim 1, wherein output generated from the system is input to an antenna array and controls the beam steering of said array.

4. A method for synchronizing multiple direct digital synthesizers across a plurality of signal generation boards comprising the steps of:
   receiving an external clock signal from a clock source;
   generating multiple copies of the external clock signal and distributing the copies to a plurality of signal generation boards;
   receiving a copy of the external clock signal at each of said plurality of signal generation boards;
   at each of said plurality of signal generation boards:
      distributing the external clock signal to respective external clock inputs of a plurality of direct digital synthesizers therein; and
      generating a translated version of the external clock signal and distributing the translated version of the external clock signal to a respective synchronization input of each of the plurality of direct digital synthesizers.

* * * * *